US011098859B2

(12) United States Patent
Reeves

(10) Patent No.: US 11,098,859 B2
(45) Date of Patent: Aug. 24, 2021

(54) PORTABLE SOLAR LIGHT

(71) Applicant: Ray Reeves, Camp Verde, AZ (US)

(72) Inventor: Ray Reeves, Camp Verde, AZ (US)

( * ) Notice: Subject to any disclaimer, the term of this patent is extended or adjusted under 35 U.S.C. 154(b) by 236 days.

(21) Appl. No.: 16/068,425

(22) PCT Filed: Jan. 9, 2017

(86) PCT No.: PCT/US2017/012735
§ 371 (c)(1),
(2) Date: Jul. 6, 2018

(87) PCT Pub. No.: WO2017/120590
PCT Pub. Date: Jul. 13, 2017

(65) Prior Publication Data
US 2020/0224837 A1    Jul. 16, 2020

Related U.S. Application Data

(60) Provisional application No. 62/275,805, filed on Jan. 7, 2016, provisional application No. 62/412,837, filed on Oct. 26, 2016.

(51) Int. Cl.
| F21L 4/08 | (2006.01) |
| F21V 21/08 | (2006.01) |
| H02J 7/00 | (2006.01) |
| F21L 4/04 | (2006.01) |
| F21V 1/14 | (2006.01) |
| F21V 21/14 | (2006.01) |

(52) U.S. Cl.
CPC ............... *F21L 4/08* (2013.01); *F21L 4/04* (2013.01); *F21V 1/143* (2013.01); *F21V 21/0832* (2013.01); *F21V 21/145* (2013.01); *H02J 7/00712* (2020.01); *H02J 2207/30* (2020.01); *H02J 2300/24* (2020.01)

(58) Field of Classification Search
CPC .. F21L 4/08; F21V 1/143; F21V 1/145; F21V 21/0832; F21V 21/13; F21S 9/035; F21S 9/037
See application file for complete search history.

(56) References Cited

U.S. PATENT DOCUMENTS

| 8,459,851 B2* | 6/2013 | Wemmer | F21S 19/005 362/557 |
| 2008/0092440 A1 | 4/2008 | Johnson | |

(Continued)

*Primary Examiner* — Karabi Guharay
(74) *Attorney, Agent, or Firm* — David Guerra

(57) ABSTRACT

A portable solar light system is configured to move from outdoors during the day, wherein batteries are charge by photovoltaic cells, to indoors at night to provide lighting. A portable solar light system has a Sight fixture that has one or more solar light assemblies attached thereto. A photovoltaic cell is configured on a top surface of the tight fixture and the light projects light from the bottom surface of the light fixture, Sn addition, a light fixture has a top and bottom connector to allow easy placement of the fight fixture both outdoors and indoors. The top and/or bottom connectors have attachment features to allow a hook to be attached to enable the light fixture to be hung in a desired location and the bottom connector may be attached to a stand-base to form a floor lamp. An extension rod may be configured into the top or bottom connectors.

16 Claims, 12 Drawing Sheets

(56) References Cited

U.S. PATENT DOCUMENTS

| | | | |
|---|---|---|---|
| 2010/0302764 A1* | 12/2010 | Yu | F21V 29/83 |
| | | | 362/183 |
| 2012/0081888 A1 | 4/2012 | Richmond | |
| 2012/0325278 A1 | 12/2012 | Buelbs | |
| 2015/0362171 A1 | 12/2015 | Li | |
| 2015/0374083 A1 | 12/2015 | Zon | |
| 2016/0320050 A1* | 11/2016 | Barnhart | A63B 69/36 |

* cited by examiner

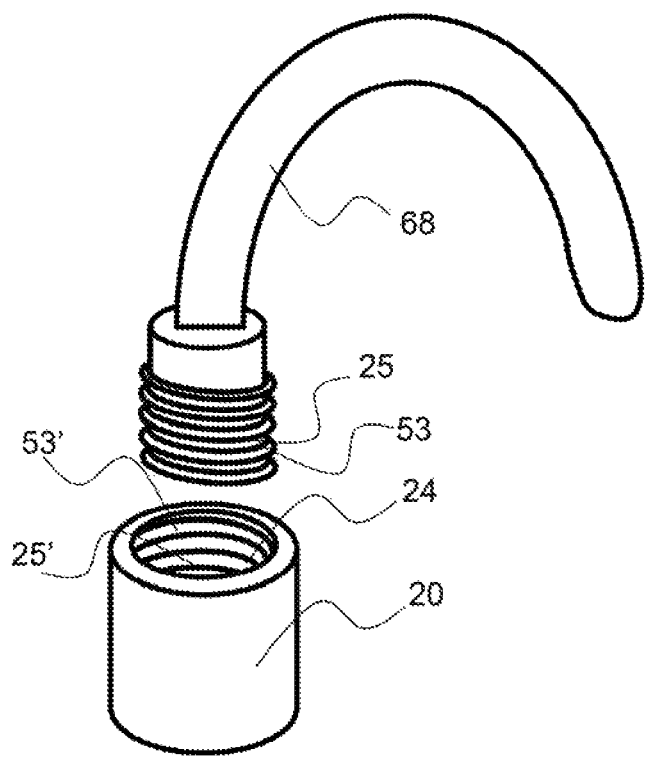
FIG. 5
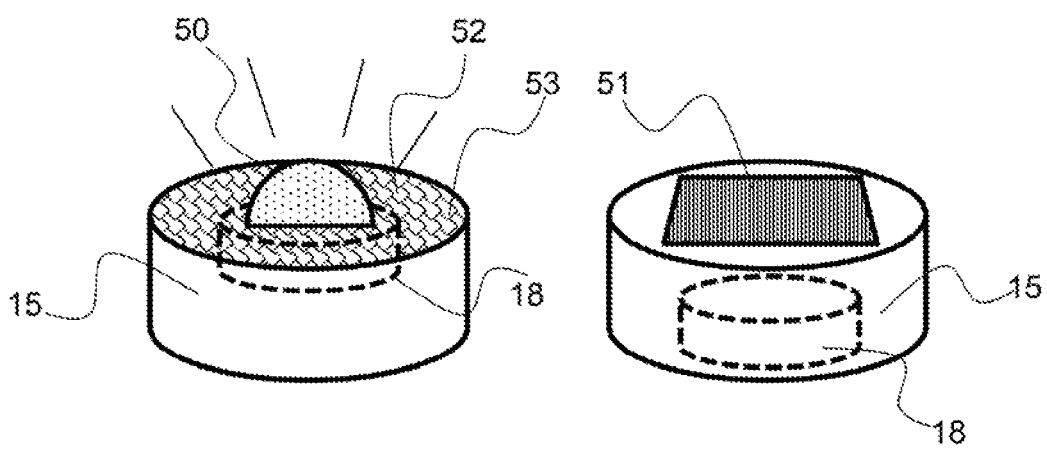
FIG. 6
FIG. 7

PORTABLE SOLAR LIGHT

CROSS REFERENCE TO RELATED APPLICATIONS

This application claims the benefit of priority to U.S. provisional patent application No. 62/275,805, filed on Jan. 7, 2016, entitled Solar Multi-Area Light Power Source Battery Recharger and U.S. provisional patent application No. 62/412,837, filed on Oct. 26, 2016; the entirety of which is hereby incorporated by reference herein.

BACKGROUND OF THE INVENTION

Field of the Invention

The invention relates to portable solar light systems.

Background

As the price of energy increases solar energy is becoming more attractive. Solar lights are routinely used outdoors to light paths and walkways. However, these lights are typically configured in the ground and are not configured for placement indoors. There exists a need for a portable solar light system that enables a user to secure a fixture outdoors to charge batteries and then move the fixture indoors to provide light during the night.

SUMMARY OF THE INVENTION

The invention is directed to a portable solar light system that is configured to move from outdoors during the day, wherein batteries are charge by photovoltaic cells, to indoors at night to provide lighting. An exemplary portable solar light system comprises a light fixture that has one or more solar light assemblies attached thereto. A photovoltaic cell may be configured on a top surface of the light fixture and the light may be configured to project light from the bottom surface of the light fixture. In addition, an exemplary light fixture has a top and bottom connector to allow easy placement of the light fixture both outdoors and indoors. The top and/or bottom connectors may have threads or some other connection feature to allow a hook to be attached for hanging the light fixture, or for attachment to a stand-base or stand, a mountain bracket, or to a lamp base. An exemplary portable solar light system may further comprise an extension rod that may be used for hanging the light fixture in high locations or for coupling with a lamp base, a stand-base, mounting bracket or a ground recess.

An exemplary portable solar light system comprises a light fixture comprising a light support having a top surface and a bottom surface. A light support may be saucer shaped, wherein the outer perimeter is circular in shape and tapers up toward the top or a central axis, or along the height to the top. The light support may have an outer diameter of no more than about 1 m, no more than about 0.5 m, or no more than about 0.2 m, and any range between and including these diameters. A light fixture is portable, having a size and weight to allow a single individual to carry the light fixture by hand. The light support may consist of this saucer shaped article and it may be relatively thin and lightweight. It may be made out of thin sheet of metal or plastic, for example. The thickness may be less than about 25 mm, less than about 20 mm, less than about 15 mm, less than about 10 mm and any range between and including the values provided. A light support may square or rectangular in shape and may configurable into a flat sheet or panel and may have a one, two, three, four or more hinges that extend across the light support to allow various portions to be rotated to direct light or to recreate a light fixture that projects light around a perimeter, such as 360 degrees about the light fixture.

In an exemplary embodiment, the light fixture comprises one or more solar light assemblies that are attached to the light fixture, wherein each solar light assembly comprises a photovoltaic cell and a light. A light fixture may comprise one or more photovoltaic cells that charge one or more batteries and these one or more batteries may charge one or more lights. Any suitable number of solar light assemblies may be attached to the light fixture, such as one, two or more, five or more, eight or more, ten or more, fifteen or more, twenty or more and any range between and including the number provided. In an exemplary embodiment, the solar light assembly is an integral solar light assembly, being configured in a housing an being a one-piece unit. The photovoltaic cell may be on one side of the housing and the light may be on the other side. A solar light assembly or integral solar light assembly may be detachably attachable to the light support and may comprise an attachment feature, such as hook-and-loop fastener that is detachably attachable to a corresponding hook-and-loop fastener on the light support. Any other suitable type of attachment feature may be used however. The light support may have an aperture to allow the light to shine or extend through when the solar light assembly is attached. In this embodiment, each integral solar light assembly works independently and comprises a separate or individual battery and controller within the housing. If one integral solar light assembly goes bad, it can be replaced. In addition, a light support may have a number of apertures therethrough and a user may attach as many integral solar light assembly to the light support as desired, making the light fixture scalable for the amount of light needed.

A Fresnel lens may be configured over the top surface of the light fixture to increase solar charging. A Fresnel lens may be configured over the entire light support and be detachably attachable or may be configured over individual light fixtures, and may be an integral part of the light fixture.

An exemplary portable solar light system comprises one or more charging ports that enables an electronic device to be charged or powered by the battery of the portable solar light system. A charging port may be a USB port or any other suitable charging type port. In addition, an exemplary portable solar light system may comprise an electrical outlet, that can be used to charge a battery of a separate electronic device or power the device. A user may position the light fixture in the sunlight during the day and then plug in their mobile phones, watches, and the like charge the batteries of these devices or to power them for use during the night.

An exemplary portable solar light system comprises a light fixture having a hinge that allows a first and/or a second light support portion to rotate about the hinges. This may allow the user to direct the light in a desired direction. In one embodiment, the light support is configured to rotate about a plurality of hinges to form a light fixture that projects light outward around the perimeter of the bottom surface. For, example, a light support may be square or rectangular in shape and two hinges that extend along the light support may allow the light support to be configured into a triangular shape with the bottom surface facing outward. The two extended ends may rotate toward each other and latch to from outwardly illuminating lamp that can be placed on a table or floor or hung up to illuminate a room.

An exemplary portable solar light system comprises light hook that is configured to detachably attach to the top connector and/or the bottom connector. An exemplary light hook has an attachment feature, such as threads, that allow the light hook to be attached to the connector. A light hook may be attached to the top connector and the light fixture may be hung from a location hook in a ceiling to produce indoor lighting, or from a limb of a tree for solar charging. Other types of attachments may be attached to a top or bottom connector, such as a strap, cord, line or clasps, such as a karabiner. The top and bottom connectors may be detachably attachable to the light support or may be fixed to the light support and not be detachable. In addition, the top and/or bottom connectors may be centrally located on the light support, wherein they are aligned with a central axis, whereby there are no lights configured along the central axis.

An exemplary portable solar light system comprises extension rod that has an attachment feature for detachably attaching to the top and/or bottom connector of the light fixture. An extension rod may be used to position the light fixture in a high location that cannot be reached by hand. An extension rod may be telescoping to allow placement of the light fixture in very high locations. A user may attach a telescoping extension rod to the bottom connector and the light hook to the top connector and then extend the telescoping extension rod to hang the light fixture from a high tree limb, or from a high ceiling, such as a vaulted ceiling. The extension rod may have a locking feature on the connection end to ensure that the light fixture will not come loose while manipulating the light fixture with the extension rod. In addition, the extension rod may have a release interface proximal a user end of the extension rod that allows a user to release the locking feature to remove the extension rod from the light fixture. An extension rod may have a length of about 100 mm or more, about 200 mm or more, about 300 mm or more, about 500 mm or more, about 1 m or more, about 2 m or more about 3 m or more and any range between and including the lengths provided. The longer lengths may be the length when a telescoping extension rod is extended. In addition, an extension rod may have a circular cross-section, or any other cross-section shape, such as square, rectangular, polygonal, irregular and the like. A telescoping extension rod may have a circular cross-section over the expanding section and then have a different cross-sectional shape at the connection end. A more secure fit may be made with the light fixture if the connection end shape has flat surfaces, wherein the cross-section is square or rectangular, for example.

An exemplary portable solar light system comprises an on/off feature for turning on/off the lights. Each of the solar light assemblies may have an individual on/off switch, or a central on/off switch may turn on/off the one or more lights powered by the one or more rechargeable batteries. The battery or batteries of a portable solar light system may be detachable to the light fixture and a user may configure one portable solar light system outside for charging batteries and exchange the batter from this outside unit with a plurality of indoor units as needed. In addition, the rechargeable batteries may be used to power other electronic devices, such as cordless drills, household appliances, and the like. Since the light fixture may be in a high and remote location, an exemplary portable solar light system may comprise a sound sensor that allows a user to turn on/off the lights with a sound, such as the clapping of their hands or saying something that is detected by the sound sensor, such as, "Lights Off."

An exemplary portable solar light system comprises a stand-base that is detachably attachable to an extension rod. The stand-base comprises a plurality of legs and may have wheels to allow the stand-base to be moved from room to room. A light fixture attached to a stand-base by an extension rod may form a floor lamp when used indoors. A stand-base may be used to support the light fixture for solar charging during the day as well.

An exemplary portable solar light system comprises a lamp base that has a lamp connector for connecting with the light fixture, or with the extension rod that then attaches to the light fixture. A user may attach the light fixture to the lamp connector to provide light in a regular location within the home.

An exemplary portable solar light system comprises a mounting bracket that is detachably attachable to the light fixture and/or the extension rod. An exemplary mounting bracket may have a threaded connection type attachment feature or a locking attaching feature, with a release, for example. A light fixture or extension rob may be attached to the mounting bracket and positioned by a hinge or swivel configured on the mounting bracket. The Mounting bracket may be fixed to a wall or other fixed location or may be coupled to the other items mentioned herein, the stand-base, extension rod, lamp base and the like. A first mounting bracket may be fixed to a fixed location and a second mounting bracket may be configured between an extension rod and the light fixture, for example.

An exemplary portable solar light system comprises a retractable shade cover that is attached or detachably attached to the light fixture and configured to extend around the top surface of the light fixture to produce a more aesthetically appealing light fixture when used indoors for lighting. An exemplary retractable shape has a cover material that extends from a fixed end and may be any suitable color or design. The cover material extends over the photovoltaic cells and may be waterproof for use outdoors.

The portable solar light system of the present invention can be used in a unique way to provide lighting and/or power. The light fixture may be configured outdoors such as by placement in a receiver in the ground, by way of the extension rod, or hung from an object, such as a tree or clothes line, for example, to charge the rechargeable batteries. The light fixture may then be brought indoors to provide illumination, wherein the rechargeable battery provides the electrical power for the lights. The rechargeable battery may also provide power to other electronic devices through a charge port and/or an electrical plug configured on the light fixture. In addition, the rechargeable battery may be detached from the light fixture and installed in another electronic device, including another light fixture of the present invention. The light fixture may be hung from the ceiling using a hook attached to the top connector, or the extension rob may be configured between the light fixture and a stand-base to produce a standing-lamp, for example.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 5 shows a perspective view of an exemplary top connector having threads for connection with a light hook.

FIGS. 6 and 7 show perspective views of an exemplary integral solar light assembly.

FIG. 22 shows the exemplary portable solar light system shown in FIG. 21 with the first and second portions rotated to form an enclosure type light fixture wherein the top surface faces the interior of the enclosure and the bottom surface forms an outer perimeter of the enclosure.

Figure 1:
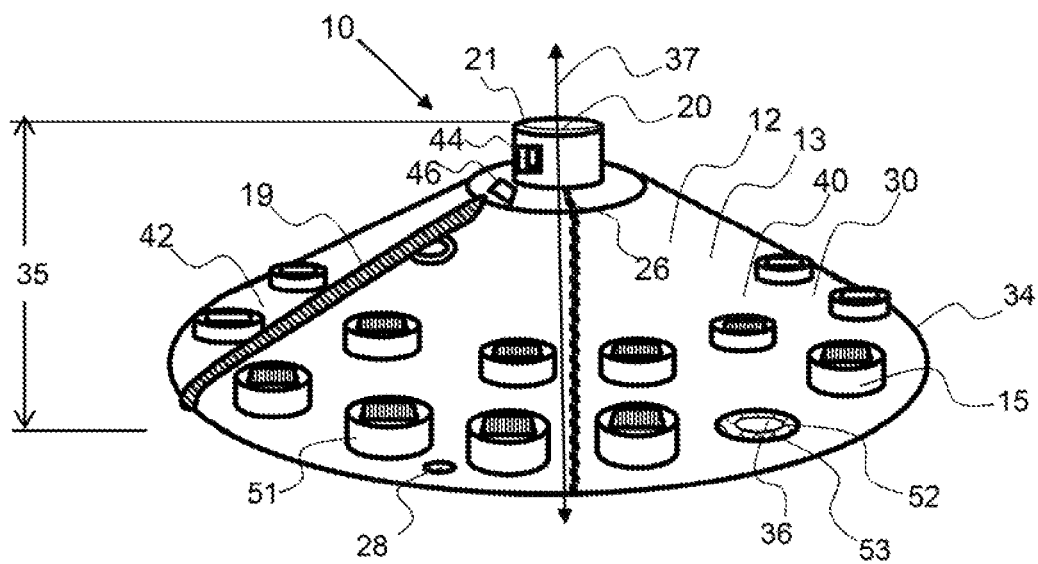
FIG. 1 shows a top perspective view of an exemplary portable solar light system comprising a light fixture and a plurality of solar light assemblies.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
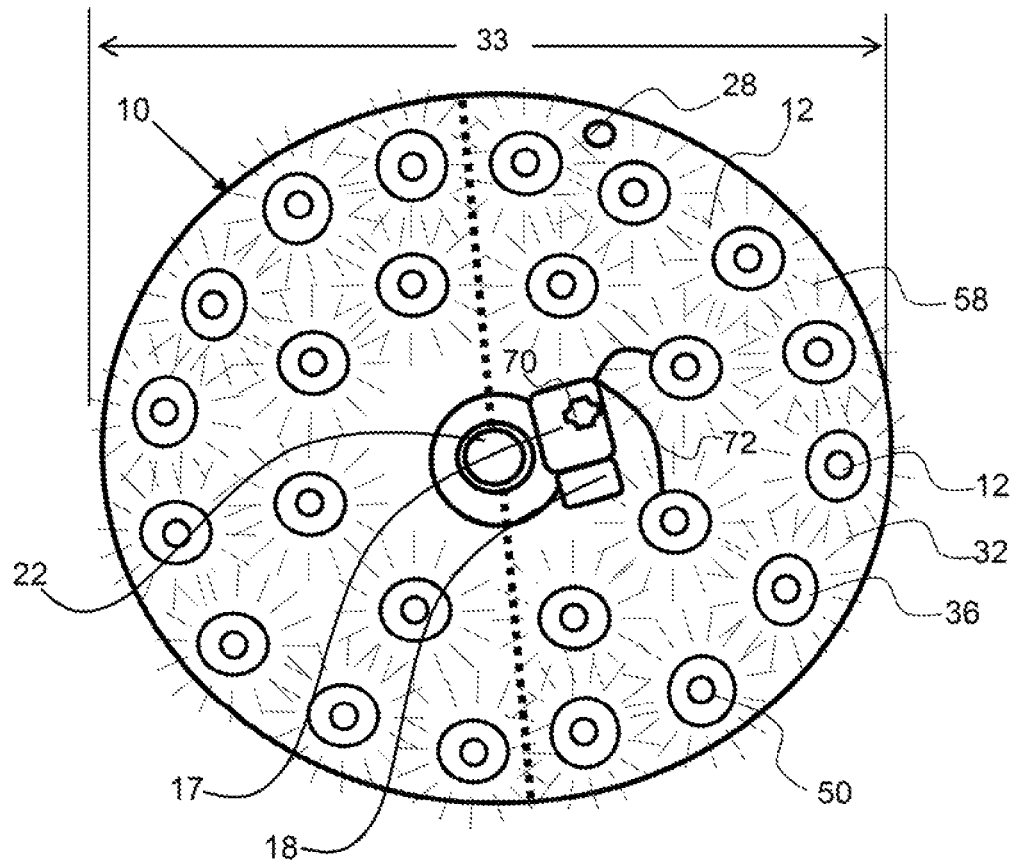
FIG. 2 shows a bottom perspective view of an exemplary portable solar light system comprising a light fixture and a plurality of solar light assemblies.

Referring to FIGS. 1 and 2, an exemplary portable solar light system 10 comprises a light fixture 12 and a plurality of solar light assemblies 15. The light support 13 of the light fixture is saucer shaped having a concave shape, or a tapering diameter from the outer perimeter 34 to the top-center, or center axis 37. The top surface 30 of the light support has a plurality of solar light assemblies connected thereto. The solar light assemblies comprise a light 50 and a photovoltaic cell 51. The solar light assemblies may be detachably attachable to the light support, wherein the light support has an aperture 36 to allow the light to shine down from the bottom surface 32. An attachment feature 52, such as a hook-and-loop fastener 53 may be configured to enable detachable attachment of the solar light assembly to the light support 13. Other types of attachment features may be used however. The solar light assemblies may comprise individual batteries, enabling them to function independently from the other solar light assemblies. In this way, one light may be replaced easily when required. A hinge is configured between a first and second portion of the light support to allow rotation of one or both portions to direct light in a desired direction. The light fixture or light support 13 has a diameter 33 as shown in FIG. 2. The light fixture 12 or light support 13 has a height 35 from the bottom or outer perimeter 34 to the top 21. The light support has a circular outer perimeter. An on/off switch 44 is provided to turn lights on and off as desired. A sensor 46, such as a sound sensor, may be used to allow turning off the lights by producing a sound, such as clapping of your hands, or speaking a certain phrase, such as, "Lights Out", for example. A reflective material 58 is shown configured over the bottom surface 32 of the light fixture. A reflective surface may enhance the light projection from the light fixture.

The light fixture 12 has a top connector 20 and a bottom connector 22 that are configured for attachment to an extension rod or a light hook, or to a mounting bracket. The top and bottom connectors may have a recess for receiving a connecting article, such as a rod. In one embodiment, the top and bottom connectors comprise threads to enable a connection article, such as an extension rod, having corresponding threads, to detachably attach thereto.

A retractable shade cover is configured over the top surface 30 of the light support to allow the photovoltaic cells 51 to be covered for aesthetic purposes. The shade may be fabric material having a pattern or other design, and the retractable shade cover may be detachably attachable to the light fixture to allow changing of the design of the cover material as desired The photovoltaic cells may have electrical leads 72 that connect the cell to a rechargeable battery 17. The rechargeable battery may provide electrical power to the lights 50. A control system 18 may comprise a microprocessor 70 that controls the function of the portable solar light system 10.

Figure 3:
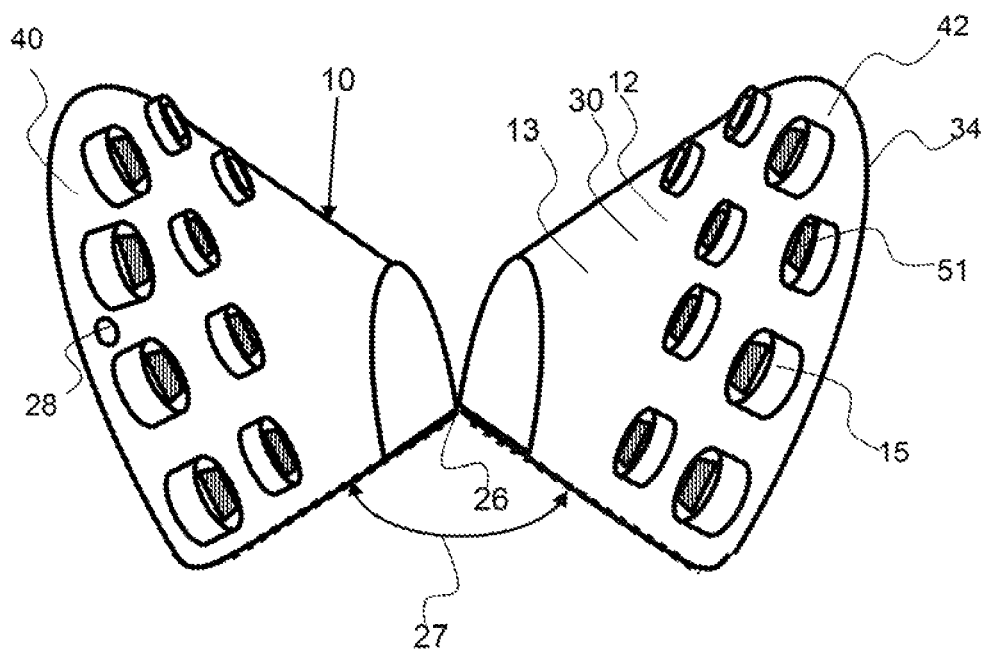
FIG. 3 shows a side view of an exemplary portable solar light system being rotated into an open configuration about a hinge.

As shown in FIG. 3, an exemplary portable solar light system 10 has been rotated into an open configuration about a hinge 26. The first portion 40 and second portion 42 of the light support are rotated away from each other at an opening angle of 27. Rotating the first and/or second portion up, as shown allows a user to direct light in a desired direction.

Figure 4:
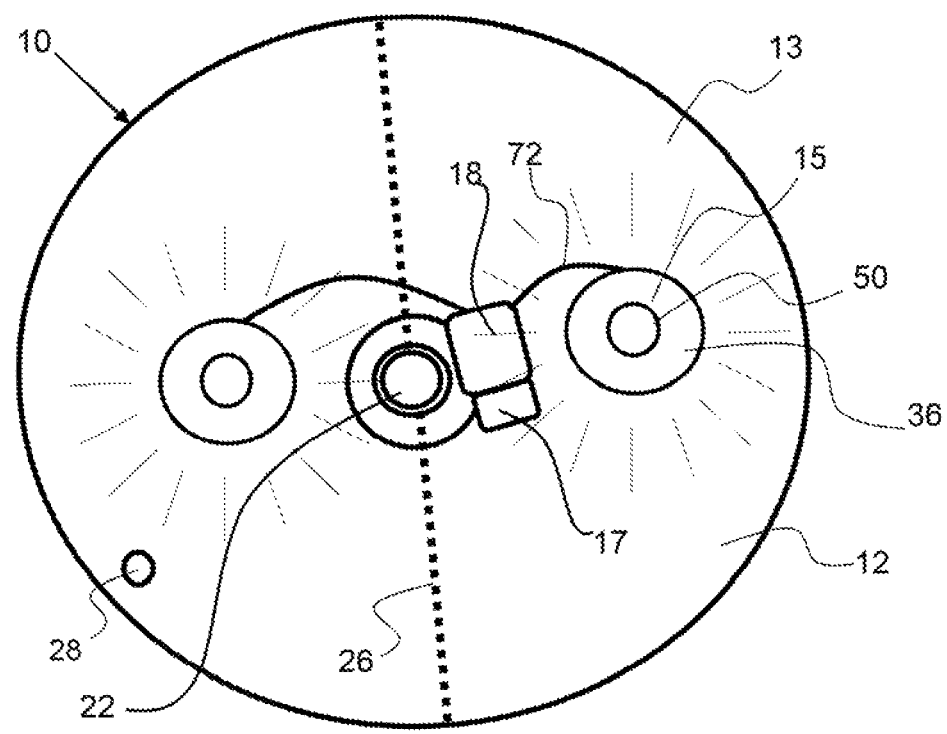
FIG. 4 shows a bottom perspective view of an exemplary portable solar light system comprising a light fixture and a plurality of solar light assemblies.

As shown in FIG. 4, an exemplary portable solar light system 10 comprises a light fixture 12 and a plurality of solar light assemblies 15. The lights 50 are powered by the rechargeable battery 18 through electrical leads 72. The control system 17 may control charging and discharging of the batteries.

As shown in FIG. 5, an exemplary top connector 20 has a receiver recess 24 having an attachment feature 53', or female threads 25', for connection with a light hook 68 having an attachment feature 53, or corresponding male threads 25. This type of threaded recess may also be configured on the bottom connector. In addition, the top and/or bottom connectors may be configured with male threads and the connecting article may have a recess and female threads for connection with the connector.

As shown in FIGS. 6 and 7, an exemplary solar light assembly 15 is an integral solar light assembly wherein the light 50 and the photovoltaic cell 51 are configured in a one-piece unit. A battery 18 and other required electronics may also be configured in this solar light assembly 15. This type of solar light assembly may be detachably attachable to the light fixture or light support as shown in FIG. 1. An attachment feature 52, such as a hook-and-loop fastener 53, may be configured on the light side of this integral solar light assembly to allow detachable attachment to the light support, over an aperture.

Figures 8, 9, 10:
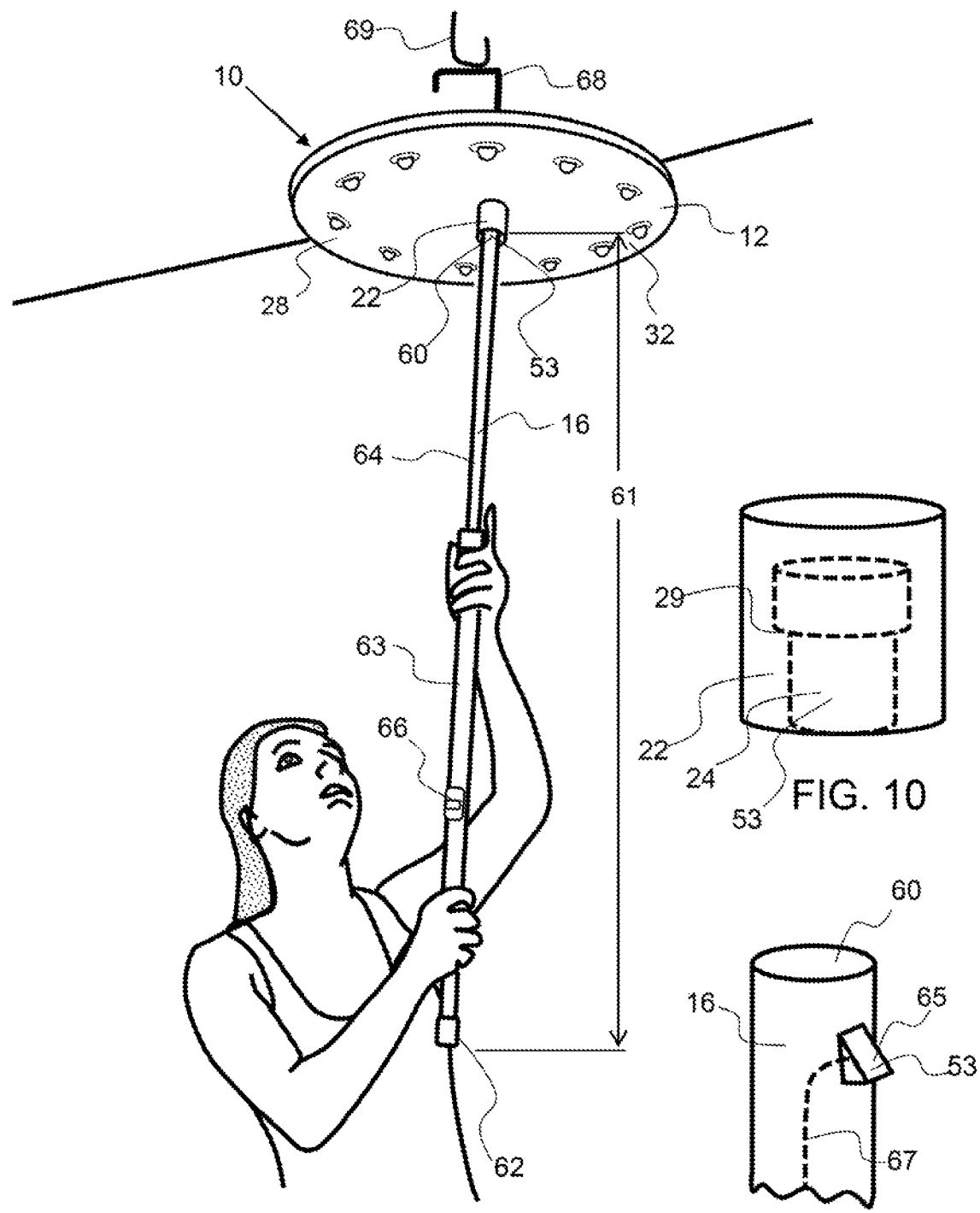
FIG. 8 shows a person attaching an exemplary portable solar light system to a location hook using a telescoping extension rod.
FIG. 9 shows a perspective view of the connection end of an exemplary extension rod having a locking feature.
FIG. 10 show a perspective view of an exemplary connector.

As shown in FIG. 8, a person is attaching an exemplary portable solar light system 10 to a location hook 69, that is retained in the ceiling, using an extension rod 16. The extension rod is a telescoping extension 63 having telescoping segments 64 to allow placement of the light fixture 12 in high locations. The extension rod has a length 61 that is adjustable by the advancement of the telescoping segments. The light hook 68 is attached to the top connector of the light fixture by an attachment feature and is configured to hook around the location hook 69. The connection end 60 of the extension rod 16 has an attachment feature 53 for detachably attaching the light fixture, such that the light fixture may be removed after being hooked onto the location hook. The connection end 60 of the extension rod 16 may have a locking feature 65, as shown in FIG. 9, that is spring loaded and pops out to prevent the light fixture from disengaging from the extension rod. The bottom connector 22 shown in FIG. 10 has a recess 24 that has a flange 29 to trap the locking feature 65 when it pops out after insertion. A release interface 66, configured proximal to the user end 62 of the extension rod 16, allows the user disengage the locking feature, such as by pulling it back, through manipulating the release line 67, to allow the connection end of the extension rod to be pull from the connector. It is to be understood that the top and/or bottom connector may have a recess and flange.

Figure 11:
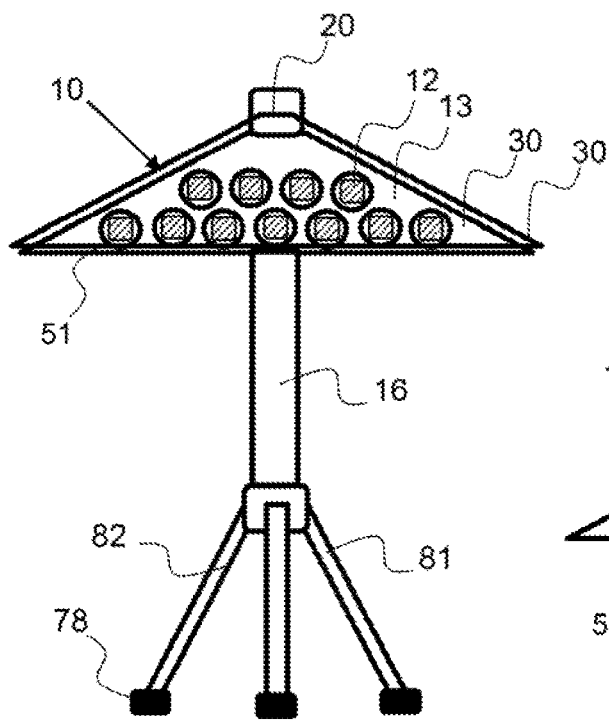
FIG. 11 shows a side view of an exemplary portable solar light system attached to a stand-base by an extension rod.

As shown in FIG. 11, an exemplary portable solar light system 10 is attached to a stand-base 81 by an extension rod 16. The stand-base has a plurality of legs 82 to enable the light fixture to be self-standing. This type of arrangement may be used outside to charge the batteries or may be used indoors. In addition, the stand-base may be configured with wheels 78 to allow the light fixture stand-base assembly to be portable and rolled from one room to another, for example. Also shown in FIG. 11 is a Fresnel lens 59 configured over the light fixture to enhance solar charging by focusing the light onto the photovoltaic cells.

Figure 12:
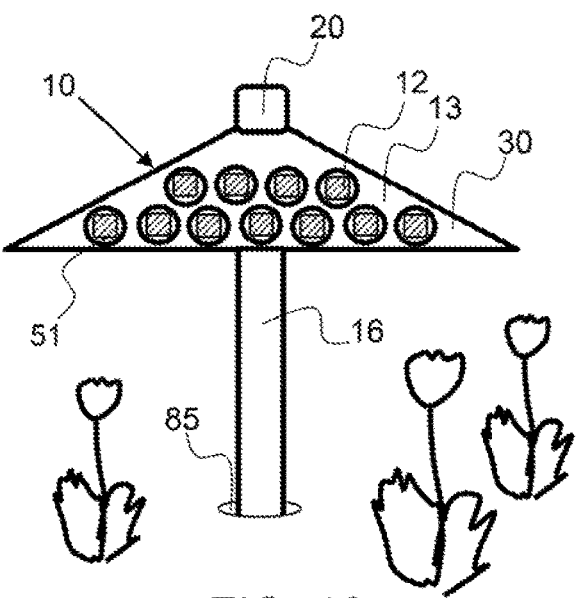
FIG. 12 shows a side view of an exemplary portable solar light system retained in the ground for solar charging.

As shown in FIG. 12, an exemplary portable solar light system 10 is retained in the ground for solar charging. There is a ground recess 85, such as a cylinder for receiving the extension rod 16.

Figure 13:
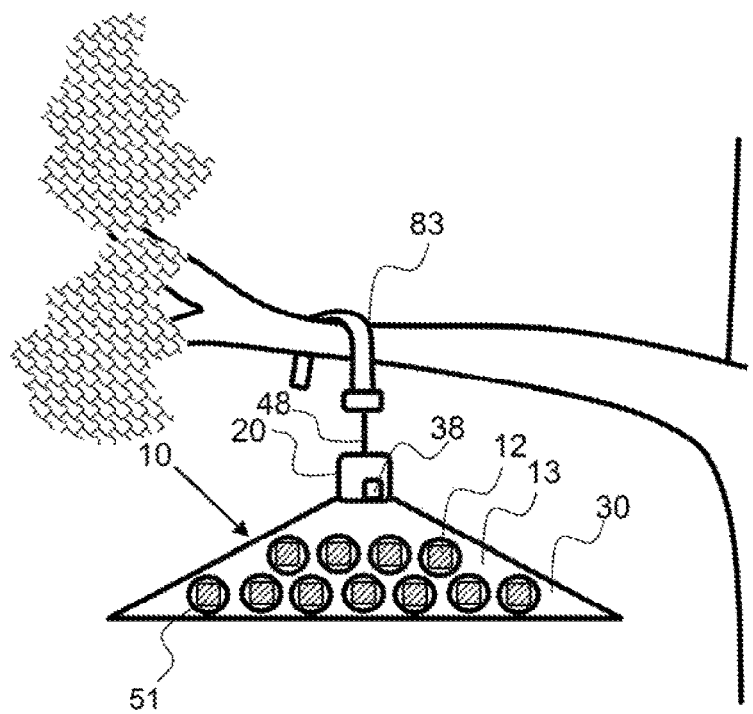
FIG. 13 shows an exemplary portable solar light system retained on a tree limb by a light hook attached to the top connector for solar charging.

As shown in FIG. 13, an exemplary portable solar light system 10 is retained on a tree limb by a light hook 83 attached to the top connector 20 for solar charging. A telescoping extension rod may be used to place the light fixture in a high limb for charging.

Figure 14:
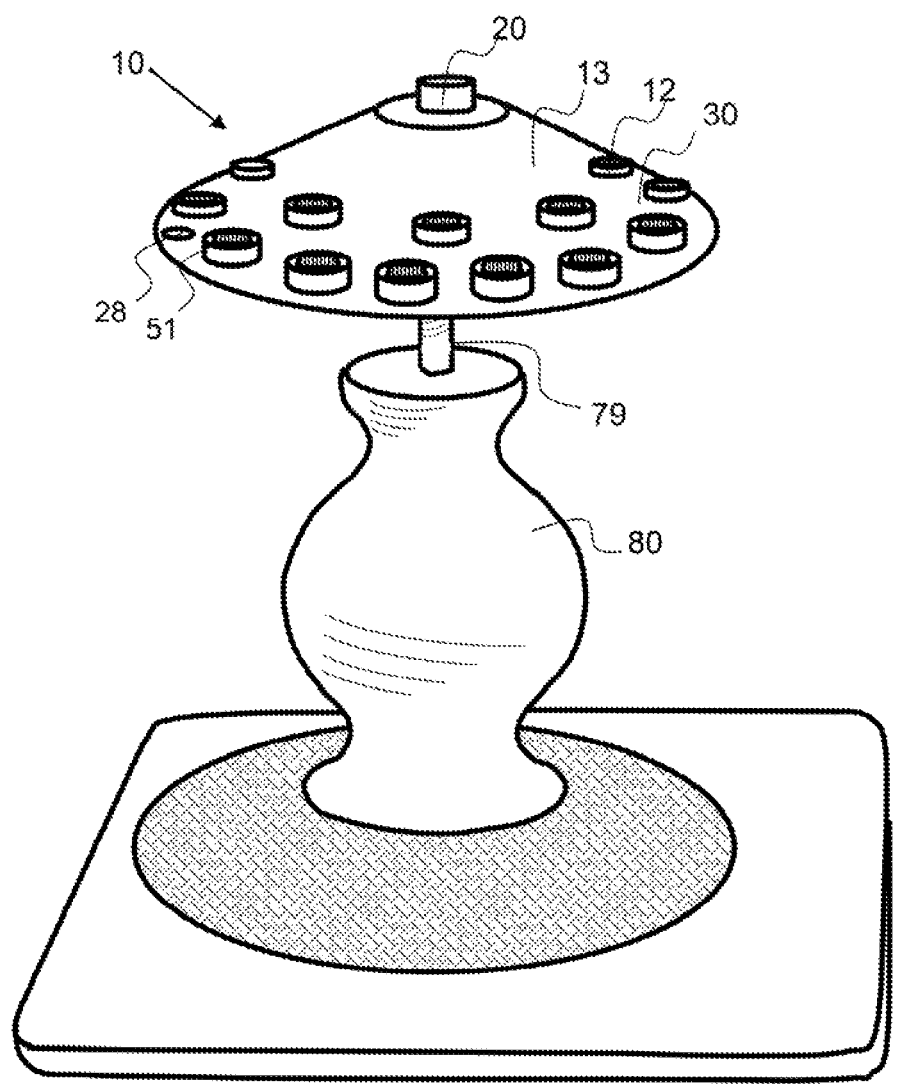
FIG. 14 shows an exemplary portable solar light system configured on a lamp base.

As shown in FIG. 14, an exemplary portable solar light system 10 is configured on a lamp base 80. The lamp base may be configured with a lamp connector or rod 79 for detachably attaching the light fixture 12 thereto. The photovoltaic cells 51 on the top surface 30 of the light support 13 may be considered non-attractive and the retractable shade cover, as shown in FIG. 15-17 may be extends over the top surface to cover the photovoltaic cells.

Figure 15:
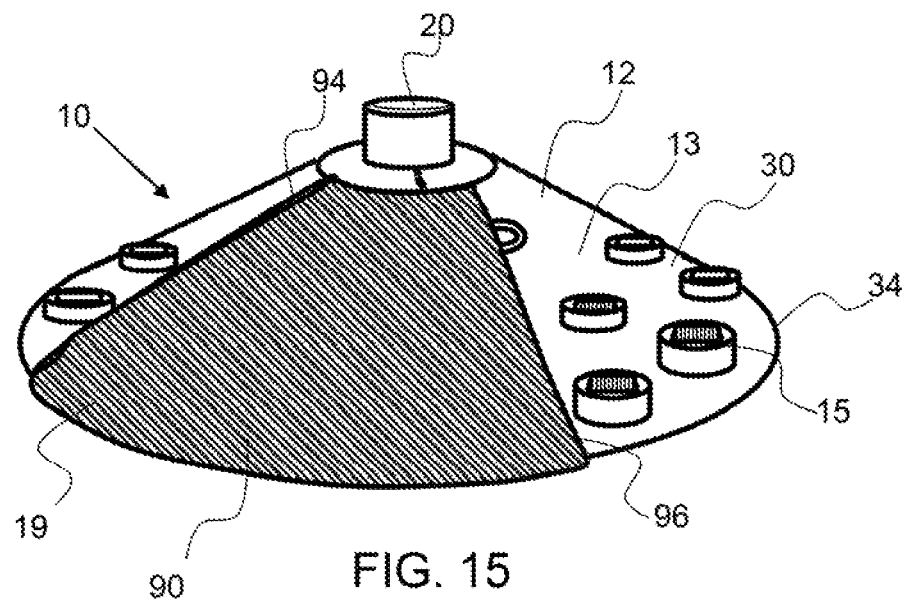
FIG. 15 shows an exemplary portable solar light system with an exemplary retractable shade cover extended partially over the top surface of the light fixture.

As shown in FIG. 15, an exemplary portable solar light system 10 is configured with an exemplary retractable shade cover 19 that is extended partially over the top surface 30 of the light fixture 12. The retractable shade cover 19 has a fixed end 94 and an extending end 96.

Figure 16:
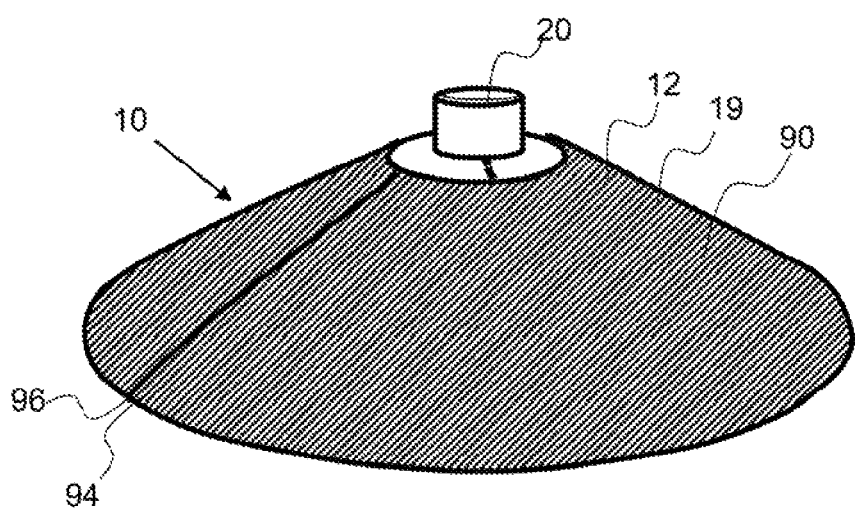
FIG. 16 shows an exemplary portable solar light system with an exemplary retractable shade cover fully extended over the top surface of the light fixture.

As shown in FIG. 16, an exemplary portable solar light system 10 has the exemplary retractable shade cover 19 fully extended over the top surface of the light fixture. The cover material 90 of the retractable shade cover 19 may be a desired color or pattern. In addition, the retractable shade cover 19 may be detachably attachable to the light fixture to allow changing of the design, as desired.

Figure 17:
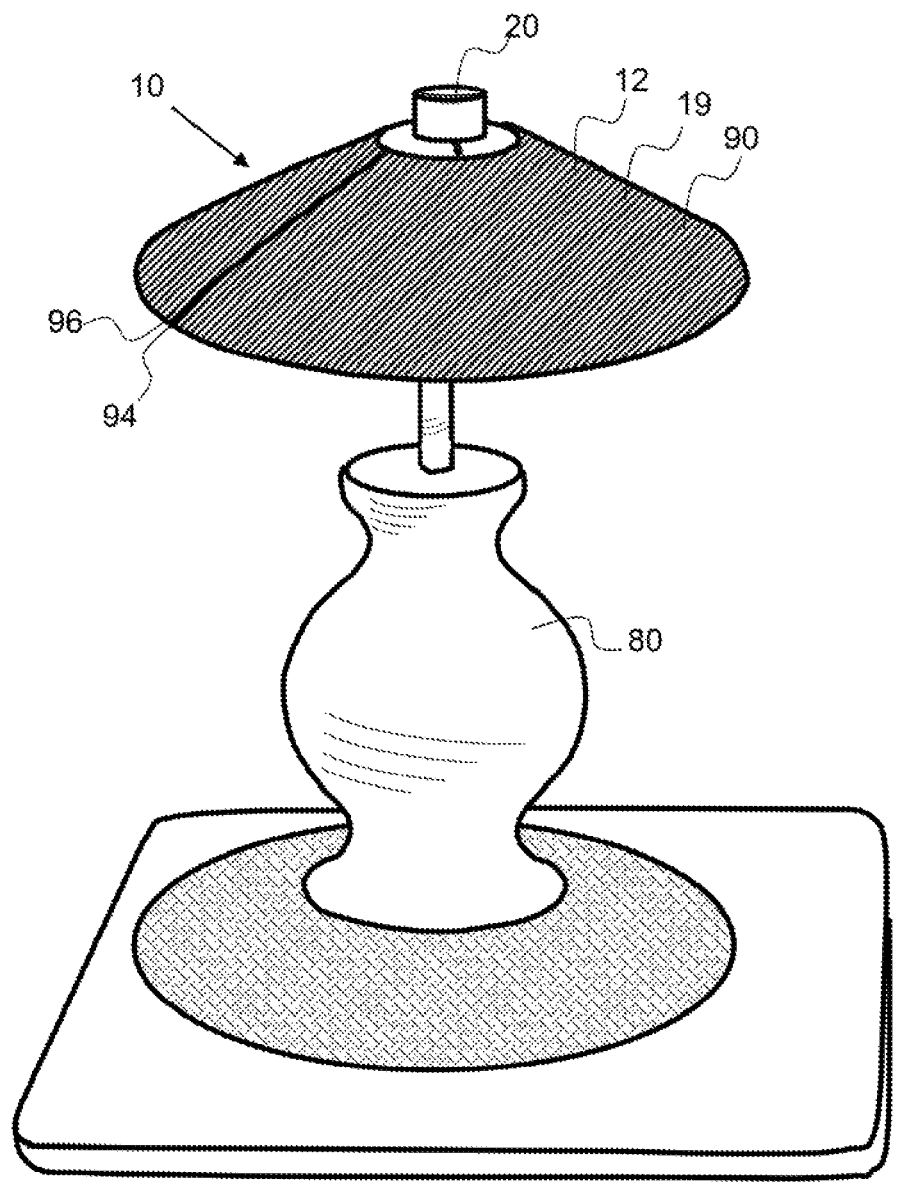
FIG. 17 shows an exemplary portable solar light system with the retractable shade cover fully extended over the top surface of the light fixture and configured on a lamp base.

As shown in FIG. 17, an exemplary portable solar light system 10 is configured on a lamp base 80 with the retractable shade cover 19 fully extended over the top surface of the light fixture.

Figure 18:
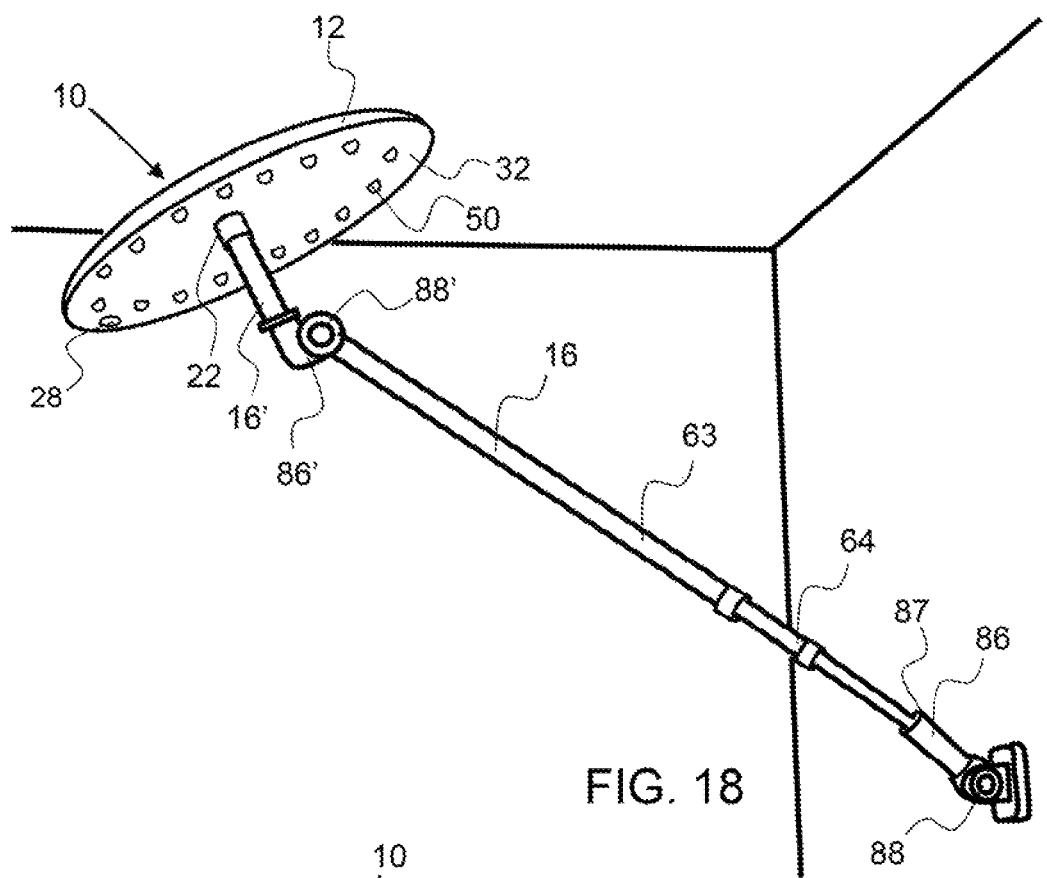
FIG. 18 shows an exemplary portable solar light system attached to a mounting bracket by the bottom connector.

As shown in FIG. 18, an exemplary portable solar light system 10 is attached to mounting brackets 86, 86' by the bottom connector 22. The mounting bracket has a mounting connector 87, which in this case is a recess for receiving the extension rod 16. The extension rod 16 is a telescoping extension rod 63 having telescoping segments 64. A plurality of hinges 88, 88' enable the light fixture to be positioned as desired. There are two degrees of freedom as shown.

Figure 19:
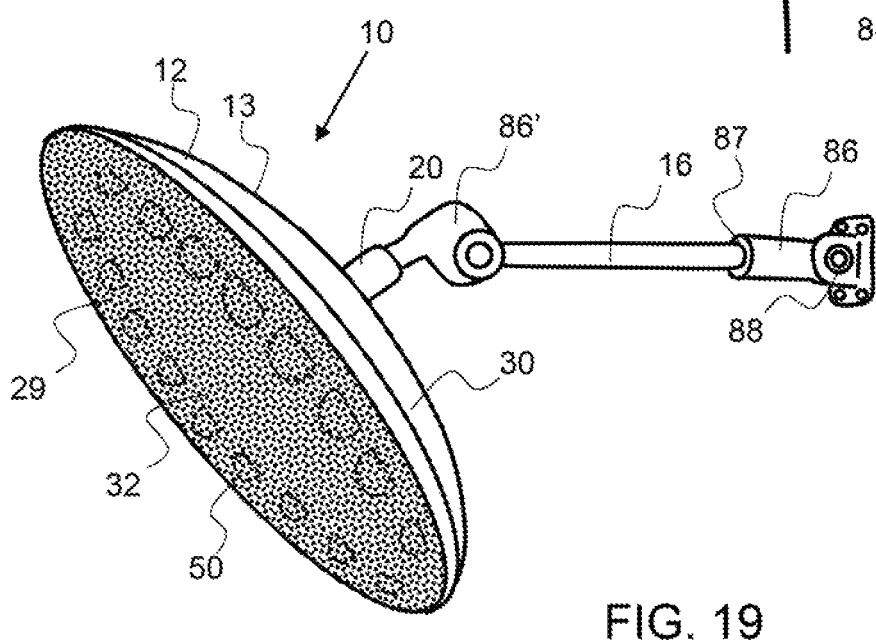
FIG. 19 shows an exemplary portable solar light system attached to a mounting bracket by the top connector.

As shown in FIG. 19, an exemplary portable solar light system 10 is attached to mounting brackets 86, 86' by the top connector 20. The light fixture 12 shown in FIG. 19 has a diffuser 29 attached to the light support 13 to diffuse the light from the plurality of lights 50 on the bottom surface 32. The diffuser may be an opaque material and may have a pattern to diffract the light to create a more uniform projected light.

Figure 20:
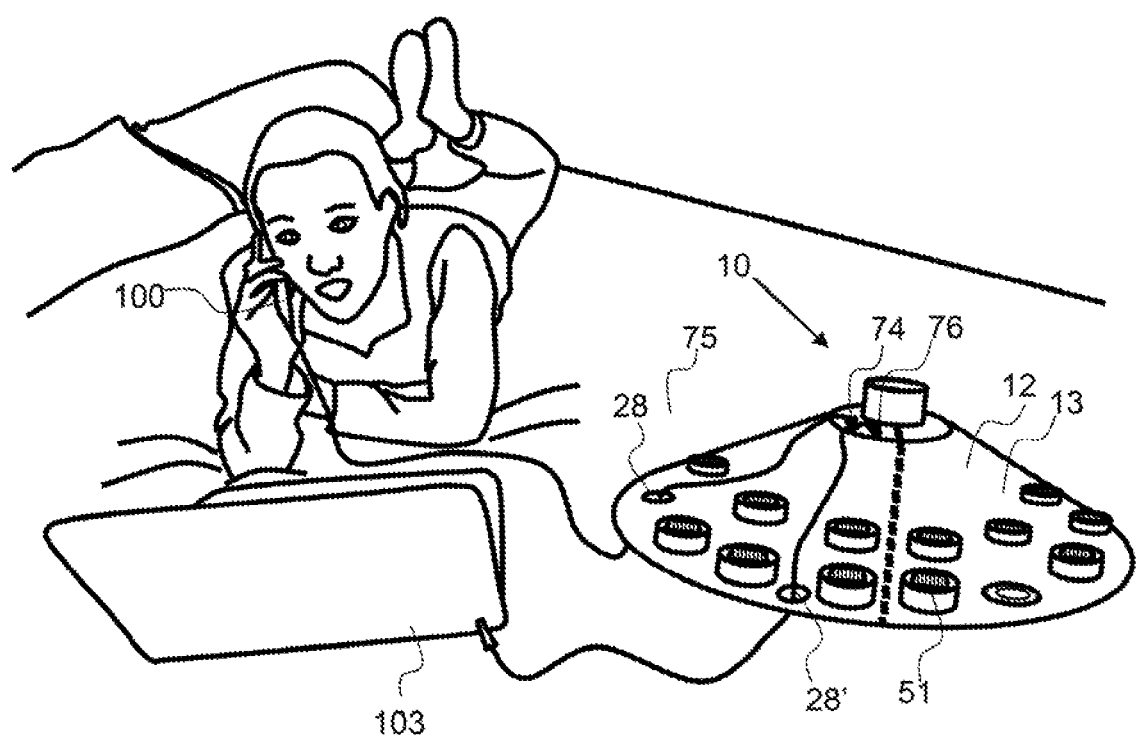
FIG. 20 shows an exemplary portable solar light system having two electronic devices attached to charging ports to provide electrical power from the battery of the exemplary portable solar light system to the electronic devices.

As shown in FIG. 20, an exemplary portable solar light system 10 is being used to provide power to two electronic devices, a mobile phone 100, and a computer 103. The mobile phone may be attached to a USB type charging port, and the computer may be plugged into an electrical outlet 76, both configured on the light fixture 12 and coupled with a battery of the portable solar light system 10. The battery of the light fixture may be charged during the day by exposure to the sun and then used to power electric devices during the evening for example. In addition, the rechargeable battery of the portable solar light system 10 may be detachably attachable and may be configured to be removed from the light fixture and fit into an electronic device to provide electrical power. Also shown in FIG. 20 are strain relief apertures 28, 28' for preventing a cord plugged into a charging port or outlet of the light fixture form damaging the cord or the charging port when the cord is pulled.

Figure 21:
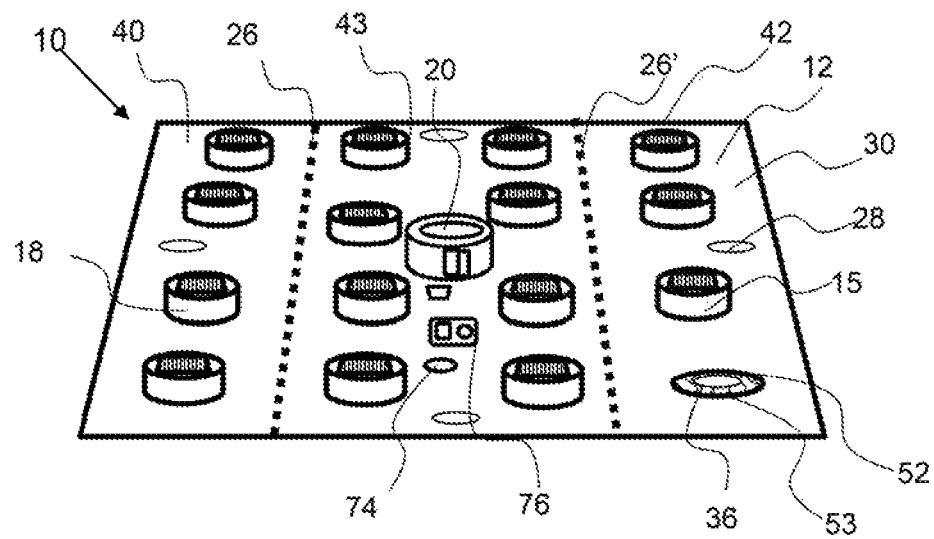
FIG. 21 shows an exemplary portable solar light system that is configured as a flat panel with two hinges that extend across the light support from the front to the back.
Figure 22:
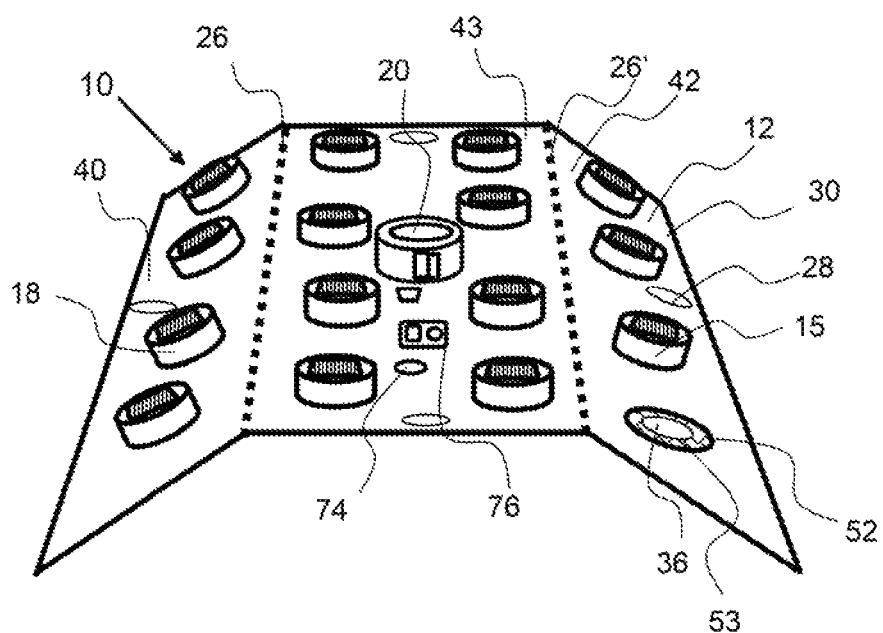
FIG. 22 shows the exemplary portable solar light system shown in FIG. 21 with the first and second portions rotated down to direct the light.
Figure 23:
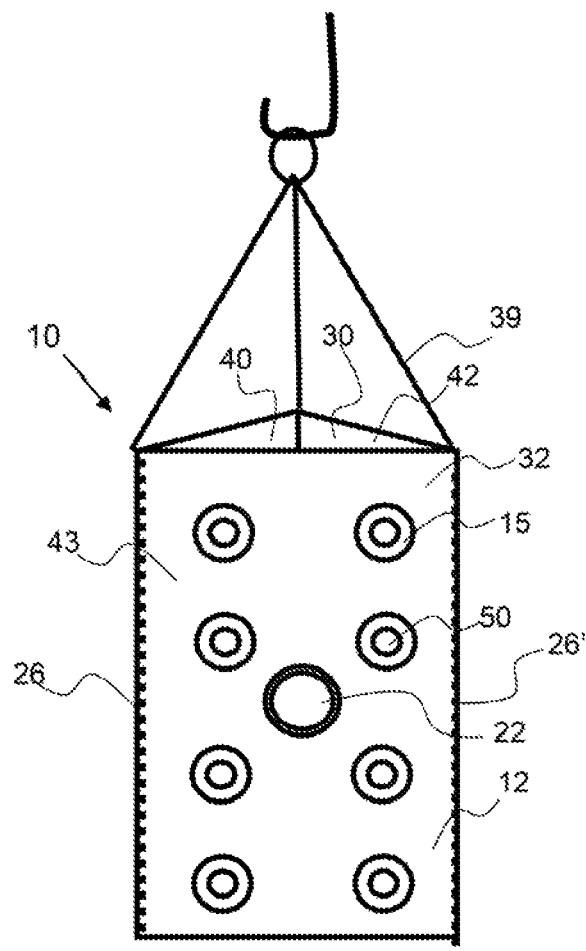
FIG. 23 shows the exemplary portable solar light system in FIG. 21 with the first and second portions rotated to form an enclosure type light fixture wherein the top surface faces the interior of the enclosure and the bottom surface forms an outer perimeter of the enclosure.

Referring now to FIGS. 21, 22 and 23, an exemplary portable solar light system 10 has a light support 12 that is a square panel with a plurality of light fixtures 15 configured thereon. The light fixture may be configured as shown in FIG. 21 for charging, wherein the flat panel light support is oriented for maximum sun exposure. The light support has two hinges 26, 26' that completely extend across the light support to allow the first portion 40 and second portion 42 to rotate to direct the light. As shown in FIG. 22, the first and second portions are rotate down to form a light fixture that will project light down along the length of the light fixture from the front to the back, much like a work-light. The first and/or second portions may also be rotated up to direct the light as desired. As shown in FIG. 23, the first and second portions are rotated about the hinges to bring extended sides toward each other. The extended sides or ends may be attached to create an enclosure type light fixture that projects light outward. The enclosure type light fixture is an outward enclosure light fixture wherein the light is projected outward about the outer perimeter of the outward enclosure light fixture. The outward enclosure light fixture is shown as being hung from a hanger by lines 39, but could also be set on a table or floor to provide illumination of a room or campsite, for example. An inward enclosure light fixture may also be formed, wherein the first and second portions are rotated to create an enclosure with the lights 50 facing inward.

FIG. 22 shows the exemplary portable solar light system shown in FIG. 21 with the first and second portions rotated down to direct the light.

FIG. 23 shows the exemplary portable solar light system shown in FIG. 21 with the first and second portions rotated to form an enclosure type light fixture wherein the top surface faces the interior of the enclosure and the bottom surface forms an outer perimeter of the enclosure.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A portable solar light system comprising:
   a light fixture comprising a light support having a top surface and a bottom surface;
   a plurality of solar light assemblies attached to the light fixture and each of the solar light assemblies is an integral solar light assembly configured in a housing and comprising:
      a photovoltaic cell configured on the top surface of the light support;
      a light configured to project light out from the bottom surface of the light support; and
      a rechargeable battery configured to be charged by the photovoltaic cell, wherein the rechargeable battery supplies electrical power to the light;
   a top connector;
   a bottom connector; and
   a mounting system comprising:
      an extension rod that is detachably attachable to the top connector and the bottom connector;
      a light hook that is detachably attachable to the top connector;
   wherein a connection end of the extension rod has a spring loaded locking feature; and
   wherein the bottom connector, the top connector or the bottom connector and the top connector comprises a flange for retaining the locking feature.

2. The portable solar light system of claim 1, wherein each of the solar light assemblies is detachably attachable to the light support, and wherein the light support comprises an aperture and an attachment feature for detachably attaching the housing to the light support.

3. The portable solar light system of claim 1, wherein the integral solar light assembly is configured in an integral solar light assembly housing and has the photovoltaic cell on one side of said housing and the light on an opposing side of said housing.

4. The portable solar light system of claim 3, wherein each of the solar light assemblies is detachably attachable to the light support, and wherein the light support comprises an aperture and an attachment feature for detachably attaching the housing to the light support.

5. The portable solar light system of claim 1, comprising a plurality of photovoltaic cells, and the light is a plurality of lights.

6. The portable solar light system of claim 1, wherein the light support is saucer shaped having a tapering diameter from an outer perimeter to a central axis.

7. The portable solar light system of claim 1, wherein the light fixture comprises a hinge between a first portion and a second portion of the light support that allows the first portion, the second portion, or the first portion and the second portion to rotate about said hinge to direct a light emitted by the light.

8. The portable solar light system of claim 1, wherein the light support is selected from the group consisting of a flat panel, rectangular in shape, and square in shape.

9. The portable solar light system of claim 1, wherein the light support comprises at least two hinges that extend across the light support to produce a first portion and a second portion configured to be rotated with respect to a central portion.

10. The portable solar light system of claim 9, wherein an extended end of the first portion and the second portion are brought together to form an enclosure light fixture.

11. The portable solar light system of claim 1, wherein the extension rod is a telescoping rod having at least one telescoping segment.

12. The portable solar light system of claim 1, wherein the top connector has a threaded connection being a recess and a female thread connection or a male thread connection.

13. The portable solar light system of claim 1, wherein the bottom connector has a threaded connection being a recess and a female thread connection or a male thread connection.

14. The portable solar light system of claim 1, further comprising:
- a controller for controlling the charging of the rechargeable battery by the photovoltaic cells, wherein when the rechargeable battery is charged above a threshold value, the controller stops charging the rechargeable battery;
- a charging port comprising a USB port for providing electrical power from the rechargeable battery to an electronic device plugged into the USB port;
- an electrical outlet for providing electrical power from the rechargeable battery to a device plugged into the electrical outlet.

15. The portable solar light system of claim 1 further comprising a mounting bracket comprising a stand-base having a plurality of legs, wherein the stand-base is detachably attachable to an extension rod that is connected with one of the top connector or the bottom connect.

16. The portable solar light system of claim 1, further comprising:
- a lamp base and a lamp connector that is detachably attachable to the bottom connector or the top connector;
- a mounting bracket having a mounting connector is detachably attachable to the bottom connector, the top connector or the bottom connector and the top connector, the mounting bracket comprises a hinge that allows the mounting connector to rotate about said hinge with respect to a fixed portion of the mounting bracket;
- a retractable shade cover that is retractable over the top surface of the light fixture, the retractable shade cover is detachably attachable to the light fixture, the retractable shade cover has a fixed end and an extending end;
- wherein the retractable shade cover in an extended configuration extends around a perimeter of the light support and covers the photovoltaic cells.

* * * * *